US00RE46667E

(19) United States
(12) Reissued Patent
Li

(10) Patent Number: US RE46,667 E
(45) Date of Reissued Patent: *Jan. 9, 2018

(54) POSITIVE ELECTRODE MATERIAL AND BATTERY USING THE SAME

(71) Applicant: Sony Corporation, Tokyo (JP)

(72) Inventor: Guohua Li, Kanagawa (JP)

(73) Assignee: SONY CORPORATION, Tokyo (JP)

( * ) Notice: This patent is subject to a terminal disclaimer.

(21) Appl. No.: 15/223,364

(22) Filed: Jul. 29, 2016

Related U.S. Patent Documents

Reissue of:
(64) Patent No.: 7,029,795
Issued: Apr. 18, 2006
Appl. No.: 10/169,454
PCT Filed: Nov. 7, 2001
PCT No.: PCT/JP01/09747
§ 371 (c)(1),
(2) Date: Oct. 7, 2002
PCT Pub. No.: WO02/39523
PCT Pub. Date: May 16, 2002

U.S. Applications:
(63) Continuation of application No. 12/101,800, filed on Apr. 11, 2008, now Pat. No. Re. 46,187, which is an application for the reissue of Pat. No. 7,029,795.

(30) Foreign Application Priority Data

Nov. 9, 2000 (JP) ..... 2000-342410

(51) Int. Cl.
*H01M 4/58* (2010.01)
*C01B 25/37* (2006.01)
(Continued)

(52) U.S. Cl.
CPC ..... *H01M 4/136* (2013.01); *C01B 25/45* (2013.01); *H01M 4/5825* (2013.01);
(Continued)

(58) Field of Classification Search
CPC ... C01B 25/45; H01M 10/0525; H01M 4/136; H01M 4/5825; H01M 4/134;
(Continued)

(56) References Cited

U.S. PATENT DOCUMENTS 6,409,984 B1 6/2002 Hattori
6,720,113 B2 * 4/2004 Goto et al. ..... 429/231.95
(Continued)

FOREIGN PATENT DOCUMENTS

CA 2334386 10/2000
CN 1170248 A 1/1998
(Continued)

OTHER PUBLICATIONS

Padhi et al, "Phospho-olivines as Positive-Electrode Materials for Rechargeable Lithium Batteries," J. Electrochemical Soc., vol. 144, No. 4, Apr. 1997, pp. 1188-1194.*
(Continued)

*Primary Examiner* — Alan Diamond
(74) *Attorney, Agent, or Firm* — Dentons US LLP

(57) ABSTRACT

The invention provides a positive electrode material and a battery using the same which can achieve a higher discharge voltage and which can obtain excellent charge-and-discharge properties, without reducing the capacity. A positive electrode (12) and a negative electrode (14) are configured through a separator (15) in between. The positive electrode (12) contains a compound expressed by a general formula $Li_{1+x}Mn_yFe_zPO_4$ (wherein x, y and z are values within ranges of $0<x<0.1$, $0.5<y<0.95$, and $0.9<y+z\leq 1$, respectively). According to the compound, the higher discharge voltage can be obtained due to Mn, the Jahn Teller effect of $Mn^{3+}$ can be attenuated and furthermore distortion of the crystal structure and the reduction of the capacity can be inhibited due to Fe and the excess Li.

8 Claims, 7 Drawing Sheets

(51) Int. Cl.

| | |
|---|---|
| ***C01B 25/45*** | (2006.01) |
| ***H01M 4/02*** | (2006.01) |
| ***H01M 4/52*** | (2010.01) |
| ***H01M 4/136*** | (2010.01) |
| ***H01M 10/0525*** | (2010.01) |
| *H01M 4/134* | (2010.01) |
| *H01M 4/40* | (2006.01) |
| *H01M 4/587* | (2010.01) |

(52) U.S. Cl.
CPC ..... *H01M 10/0525* (2013.01); *H01M 4/134* (2013.01); *H01M 4/405* (2013.01); *H01M 4/587* (2013.01); *H01M 2004/021* (2013.01); *H01M 2004/028* (2013.01)

(58) Field of Classification Search
CPC ..... H01M 4/405; H01M 2004/028; H01M 4/587; H01M 2004/021
See application file for complete search history.

(56) References Cited

U.S. PATENT DOCUMENTS 6,749,967 B2 * 6/2004 Li et al. ..... 429/231.95
7,972,728 B2 * 7/2011 Goodenough ..... C01B 25/45 429/218.1
RE46,187 E * 10/2016 Li

FOREIGN PATENT DOCUMENTS

| | | |
|---|---|---|
| EP | 0571858 | 12/1993 |
| EP | 1094532 | 4/2001 |
| EP | 1198019 | 4/2002 |
| JP | 2000-012031 | 1/2000 |
| JP | 2000-509193 | 7/2000 |
| JP | 2001-110455 | 4/2001 |
| JP | 2001-196061 | 7/2001 |
| JP | 2001-223007 | 8/2001 |
| JP | 2001-307732 | 11/2001 |
| JP | 2001-0338694 | 12/2001 |
| WO | WO 97/40541 | 10/1997 |
| WO | WO 00/60679 A1 | 10/2000 |
| WO | WO 00/60680 | 10/2000 |
| WO | WO 02/083555 | 10/2002 |

OTHER PUBLICATIONS

Japanese Office Examination Report issued in connection with related Japanese Patent application No. 2000-342410 dated Apr. 28, 2008.

* cited by examiner

POSITIVE ELECTRODE MATERIAL AND BATTERY USING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED APPLICATION DATA*

*More than one reissue application has been filed for the reissue of U.S. Pat. No. 7,029,795. This application is a reissue continuation of U.S. patent application Ser. No. 12/101,800 filed Apr. 11, 2008, now U.S. Pat. No. Re. 46,187. U.S. application Ser. No. 12/101,800 is a reissue of U.S. Pat. No. 7,029,795 issued Apr. 18, 2006, which issued from U.S. patent application Ser. No. 10/169,454 filed Oct. 7, 2002. U.S. patent application Ser. No. 10/169,454 is the Section 371 National Stage of PCT/JP01/09747 filed Nov. 7, 2001. The present application claims the benefit of priority to Japanese Patent Application No. JP 2000-342410 filed on Nov. 9, 2000 in the Japan Patent Office.*

TECHNICAL FIELD

The present invention relates to a positive electrode material comprising a phosphate compound containing Li (lithium), Mn (manganese) and Fe (iron), and a battery using the same.

BACKGROUND OF THE INVENTION

In recent years, high performances, miniaturization and portability of electronic equipments are far advanced thanks to progress in electronic technologies. Consequently, researches on a rechargeable secondary battery are directed at providing a power supply which could be used conveniently and economically for a long time. Conventionally, as a secondary battery, a lead storage battery, an alkali storage battery, and a secondary lithium-ion battery are known widely. Especially, the secondary lithium-ion battery attracts attention as a battery which can realize high output and a high-energy density.

In the secondary lithium-ion battery, for example, a metal oxide, metal sulfide, or polymer is used as a positive electrode material. Specifically, non-lithium compounds such as $TiS_2$, $MoS_2$, $NbSe_2$, or $V_2O_5$, or lithium containing oxides such as $LiCoO_2$, $LiNiO_2$, $LiMnO_2$ or $LiMn_2O_4$ are known.

Among these materials, $LiCoO_2$, which has been widely put in practical use as the positive electrode material having about 4 V potential to a lithium metal potential, has a high-energy density and a high voltage, and is an ideal positive electrode material in various aspects. However, there are problems that it becomes difficult to steadily supply Co (cobalt) and that the material cost is higher, since Co resource is unevenly distributed on the earth and is rare.

Moreover, $LiNiO_2$ is desirable as the positive electrode material since $LiNiO_2$ has a high theoretical capacity and a high discharge potential and also results in the decreasing cost. However, there are problems that the discharge capacity will be reduced because the crystal structure is collapsed as a charge-and-discharge cycle is repeated, and that the heat stability is also low. Furthermore, $LiMn_2O_4$ having a normal-spinel structure is promising as the positive electrode material, because $LiMn_2O_4$ has a high potential equivalent to $LiCoO_2$ and is able to provide a high cell capacity, and the easy synthesis of $LiMn_2O_4$ can also achieve the reduction of the cost. However, there are residual problems of the serious capacity degradation when held at high temperature for long durations, and the less stability or the insufficient cycle property that Mn may dissolve into the electrolytic solution.

Then, recently, it has been proposed that phosphate compounds of the transition metal M (M being Fe, Mn, Co, and Ni) having an olivine structure could be used as the positive electrode material (refer to Japanese Patent Laid Open No. 9-134724). Moreover, among the phosphate compounds of the transition metal M having the olivine structure, for example, $LiFePO_4$ is also proposed for use as the positive electrode material (refer to Japanese Patent Laid Open No. 9-171827).

A volume density of $LiFePO_4$ is as large as 3.6 g/cm$^3$, $LiFePO_4$ generates the high potential of 3.4 V, and the theoretical capacity thereof is also as large as 170 mAh/g. Furthermore, $LiFePO_4$ contains one Li, which can be released electrochemically, per Fe atom in the initial state, therefore $LiFePO_4$ is promising as the positive electrode material. However, the discharge voltage of $LiFePO_4$ is 3.4 V, and is lower than that of the positive electrode materials used with the current secondary lithium-ion batteries, which is a problem.

Then, it has been proposed that $LiMnPO_4$ as an olivine type phosphate compound, containing Mn which is an element with an oxidation-reduction potential higher than that of Fe as an essential component, could be used for the positive electrode material.

However, the conventional olivine type phosphate compound containing Mn as the essential component, of which the basic composition is $LiMnPO_4$, has a problem that it is difficult to generate Mn redox. According to Journal of the Electrochemical Society, 144, 1188 (1997), it is reported that only $LiMn_yFe_{1-y}PO_4$, in which Fe substitutes a part of Mn, is the example capable of generating Mn redox among the olivine type phosphate compounds containing Mn as the essential component.

Moreover, in the same paper, it is reported that the actual battery constituted by using $LiMn_yFe_{1-y}PO_4$ as the positive electrode material, showed the actual capacity of about 80 mAh/g, and it cannot be said that the sufficient capacity has been obtained.

In addition, according to the above-mentioned paper, it is reported that in the actual battery constituted by using $LiMn_xFe_{1-y}PO_4$ as the positive electrode material, the quantity of Mn, that is, "y", over 0.5 (y>0.5) causes the capacity reduction. That is, there are problems that an increase in the Mn component of $LiMn_yFe_{1-y}PO_4$ can obtain a high voltage, but cause a decrease in the capacity, while a decrease in the Mn component of $LiMn_yFe_{1-y}PO_4$ in order to obtain a high capacity can not obtain the sufficient effect of a high oxidation-reduction potential. Furthermore, there is a disadvantage that the discharge voltage decrease can cause loss of interchangeability with the current secondary lithium-ion battery.

Thus, in the case of $LiMn_yFe_{1-y}PO_4$, it is very difficult that the high capacity and the high voltage are compatible.

The present invention has been achieved in view of the above problems. It is an object of the invention to provide a positive electrode material and a battery using the same which can realize high discharge voltages and can acquire excellent charge-and-discharge properties without reducing a capacity.

SUMMARY OF THE INVENTION

A positive electrode material according to the present invention contains a compound expressed by a general formula $Li_{1+x}Mn_yFe_zPO_4$ (wherein x, y and z are values within ranges of $0<x<0.1$, $0.5<y<0.95$, and $0.9<y+z\leq 1$, respectively).

A battery according to the present invention comprises an electrolyte with a positive electrode and a negative electrode, wherein the positive electrode comprises a compound expressed by a general formula $Li_{1+x}Mn_yFe_zPO_4$ (wherein x, y and z are values within ranges of $0<x<0.1$, $0.5<y<0.95$, and $0.9<y+z\leq 1$, respectively).

In the positive electrode material according to the present invention, x of the general formula $Li_{1+x}Mn_yFe_zPO_4$ is within the range of $0<x<0.1$, and even if the Mn composition increases, it is possible to obtain a high discharge potential without reducing the capacity.

In the battery according to the present invention, since the positive electrode material of the invention is used, a high capacity and a high discharge potential can be obtained, and excellent charge-and-discharge properties can be obtained.

Other and further objects, features and advantages of the invention will appear more fully from the following description.

DETAILED DESCRIPTION OF THE PRESENTLY PREFERRED EMBODIMENTS

Figure 1:
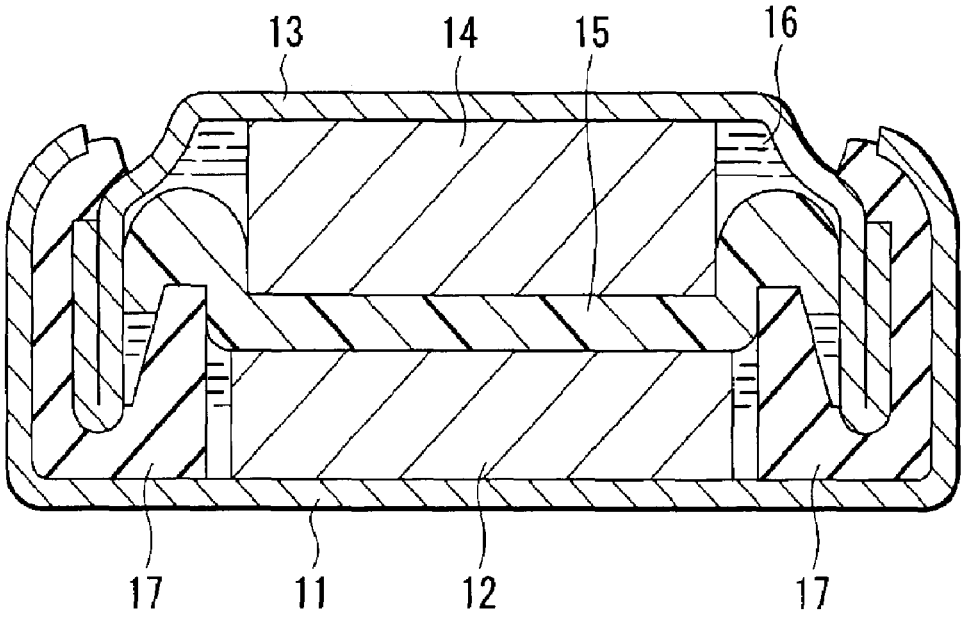
FIG. 1 is a sectional view showing the configuration of a secondary battery using a positive electrode material according to an embodiment of the invention.

Embodiments of the present invention will be described in detail below with reference to accompanying drawings.

A positive electrode material according to an embodiment of the invention contains a compound expressed by a general formula shown in chemical formula 1.

The compound has an olivine structure, and a part of Mn in lithium manganese phosphate (the stoichiometric composition thereof is expressed by $LiMnPO_4$) is substituted by Fe, and contains Li in excess. In the compound, while Mn can increase the discharge voltage, Fe and excess Li can attenuate the Jahn Teller effect resulting from $Mn^{3+}$ generated in charging, and inhibit distortion of the crystal structure and the reduction of the capacity.

Although the composition of Mn, y, may be within a range of $0\leq y\leq 1$, it is desirable that y is within a range of $0.5<y<0.95$. Because the attenuation effect produced by Fe ions on the Jahn Teller effect of $Mn^{3+}$ can be insufficiently obtained when the composition of Mn, y, is 0.95 or more, which will make the Mn redox difficult to generate, and the quantity of Mn as an essential component providing the high voltage redox may decrease when the composition of Mn, y, is 0.5 or less, which will lower the discharge voltage and reduce the energy density of the battery.

The variable x in 1+x of the Li composition, i.e., the composition of the added excess Li, is preferably within a range of $0<x<0.1$, and more preferably within a range of $0.01\leq x\leq 0.05$. It is also possible that x is within the range of $0<x<1$. However, the quantities of Mn and Fe as the essential component of the redox may decrease when x is high, which will reduce the energy density of the battery, and the attenuation effect produced by Li ions on the Jahn Teller effect of $Mn^{3+}$ can be insufficiently obtained when x is low.

It should be noted that the oxygen composition may shift from the stoichiometric composition, although the oxygen composition of the general formula shown in the chemical formula 1 is set to "4" based on the stoichiometric composition. That is, in the specification, the general formula means the most typical composition, and the compounds expressed by the general formula include a compound in which the oxygen composition is deviated from the stoichiometric composition.

And it is desired that the compound contains one with a particle diameter of 10 μm or less and that the Brunauer-Emmet-Teller specific surface area thereof is 0.5 $m^2/g$ or more. Because the diffusion of the lithium ions in the compound will not overtake the external supply of the lithium ions and the apparent capacity will decrease under the high current flow, i.e., under the introduction of a lot of lithium ions for a short time into the compound, if the particle diameter is larger and the specific surface area is smaller, since a surface area will generally become smaller at a larger particle diameter. That is, in order to secure the sufficient capacity even under the high current flow, technical provisions of increasing the specific surface area and hence of decreasing the particle size will be required.

The positive electrode material having such composition can be manufactured by various methods, for example, by mixing manganese carbonate, iron oxalate, ammonium hydrogen phosphate, and lithium carbonate and firing the mixture. Specifically, it can be manufactured by mixing manganese carbonate ($MnCO_3$), iron oxalate ($FeC_2O_4.2H_2O$), ammonium hydrogen phosphate ($NH_4H_2PO_4$), and lithium carbonate ($LiCO_3$) at the predetermined ratio, and then firing the mixture under a nitrogen atmosphere. Moreover, other than the materials mentioned above, various materials such as carbonates, nitrates, oxalates, phosphates, oxides, or hydroxides may be used.

The positive electrode material manufactured in such a manner can be used for the positive electrode of the following secondary batteries, for example.

FIG. 1 shows a sectional structure of a secondary battery using the positive electrode material according to the embodiment. The secondary battery is a so-called coin type one. The secondary battery has a structure formed such a way that a disk-like positive electrode 12 housed in an exterior can 11, and a disk-like negative electrode 14 housed in an exterior cup 13, are laminated with a separator 15 disposed therebetween. The inside of both the exterior can 11 and the exterior cup 13 is filled with an electrolytic solution 16 which is a liquid electrolyte, and a periphery area of both the exterior can 11 and the exterior cup 13 is sealed by caulked via an insulating gasket 17.

Each of the exterior can 11 and the exterior cup 13 is composed of, for example, a metal such as stainless steel or aluminum. The exterior can 11 functions as a charge collector of the positive electrode 12, and the exterior cup 13 functions as a charge collector of the negative electrode 14.

For example, the positive electrode 12 contains the positive electrode material according to the embodiment as a positive active material, and is constituted to contain a conductive agent such as carbon black and graphite, and a binder such as polyvinylidene fluoride. That is, the positive electrode 12 contains the compound expressed by the general formula shown in the chemical formula 1. In this connection, the positive electrode 12 can be produced, for example, by mixing the positive electrode material, the conductive agent, and the binder to prepare a positive electrode mixture, and casting the positive electrode mixture into a pellet form by compression molding. Alternatively, the positive electrode 12 may be produced by mixing the positive electrode material, the conductive agent, and the binder, plus a solvent such as formamide or N-methyl pyrolidone, to prepare the positive electrode mixture, drying the positive electrode mixture, and casting the dried mixture with compression molding. Although the positive electrode material can be used either directly or after drying, it is more desirable to fully dry the positive electrode material. It is because that the positive electrode material would react and the function thereof as the positive electrode material would be damaged, when the positive electrode material is in contact with water.

The negative electrode 14 is constituted to contain one, two or more materials selected from the group consisting of lithium metals, lithium alloys, and materials capable of insertion and extraction of lithium, for example. As the materials capable of insertion and extraction of lithium, for example, carbonaceous materials, metal compounds, silicon, silicon compounds, or conductive polymers are listed, and one, two or more materials selected among these materials are mixed and used. Examples of the carbonaceous materials are graphite, nongraphitizing carbon, or graphitizing carbon, examples of the metal compounds are oxides such as $SnSiO_3$ or $SnO_2$, and examples of the conductive polymers are polyacethylene or polypyrrole. Especially, the carbonaceous materials are desirable because there is very little change of the crystal structure thereof produced in charge and discharge, the carbonaceous materials can obtain a high charge-and-discharge capacity as well as a good cycle property.

In this connection, when the material capable of insertion and extraction of lithium is contained in the negative electrode 14, the negative electrode 14 is composed to contain also a binder such as polyvinylidene fluoride. In this case, the negative electrode 14 can be produced by, for example, mixing the material capable of insertion and extraction of lithium with the binder to prepare a negative electrode mixture, and casting the negative electrode mixture into a pellet form by compression molding. Alternatively, the negative electrode 14 may be produced by mixing the material capable of insertion and extraction of lithium with the binder, plus a solvent such as formamide or N-methyl pyrolidone to prepare the negative electrode mixture, drying the negative electrode mixture, and casting the dried mixture with compression molding.

The separator 15 separates the positive electrode 12 and the negative electrode 14, prevents the short circuit of the current generated by the contact of both electrodes, and permits the passage of the lithium ions. The separator 15 may be composed of, for example, a porous film of a synthetic resin consisting of polytetrafluoroethylene, polypropylene, polyethylene, or the like, or a porous film of an inorganic material such as a ceramic nonwoven fabric. Or the separator 15 may have a laminating structure of two or more kinds of the above porous films.

The electrolytic solution 16 is obtained by dissolving a lithium salt as an electrolyte salt in a solvent, and may show ion conductivity when the lithium salt ionizes. As the lithium salt, $LiPF_6$, $LiClO_4$, $LiAsF_6$, $LiBF_4$, $LiCF_3SO_3$, or $LiN(CF_3SO_2)_2$ is suitable, and one, two or more kinds among them are mixed and used.

As the solvent, a nonaqueous solvent such as propylene carbonate, ethylene carbonate, butylene carbonate, vinylene carbonate, γ-butyrolactone, sulfolane, 1,2-dimethoxy ethane, 1,2-diethoxy ethane, 2-methyl tetrahydrofuran, 3-methyl-1,3-dioxolane, methyl propionate, methyl butyrate, dimethyl carbonate, diethyl carbonate, or dipropyl carbonate, is desirable, and one, two or more kinds of these solvents are mixed and used.

The secondary battery acts as follows.

In the secondary battery, during charging, the lithium ions is extracted from the positive electrode 12, and is inserted in the negative electrode 14 via the electrolytic solution 16, for example. During discharging, the lithium ions will be extracted from the negative electrode 14, and will be inserted in the positive electrode 12 via the electrolytic solution 16, for example. Here, since the positive electrode 12 contains the compound expressed by the general formula shown in the chemical formula 1,the Jahn Teller effect resulting from $Mn^{3+}$ generated in the charging will be attenuated due to Fe and the excess Li. Therefore, the distortion of the crystal structure of the compound is inhibited, and the reduction of the capacity is inhibited.

As described above, according to the positive electrode material of the embodiment, since the positive electrode material contains the compound expressed by the general formula shown in the chemical formula 1, the higher discharge voltage can be obtained due to Mn, the Jahn Teller effect of $Mn^{3+}$ can be attenuated and furthermore the distortion of the crystal structure can be inhibited due to Fe and the excess Li. Consequently, the higher discharge voltage can be achieved without reducing the capacity. Therefore, when the secondary battery is composed using the positive electrode material, the charge-and-discharge properties such as the high capacity and the high discharge potential can be obtained.

Furthermore, specific examples of the invention will be described in detail.

EXAMPLES 1-5

First, as shown in Table 1, using the various compounding ratios in Examples 1-5, manganese carbonate ($MnCO_3$), iron oxalate dihydrate ($FeC_2O_4.2H_2O$), dihydrogen ammonium phosphate ($NH_4H_2PO_4$), and lithium carbonate ($Li_2CO_3$) were mixed, and fully ground with a ball mill. Subsequently, the obtained mixture and acetylene black were mixed at 94:6 of the weight ratio, fully ground and mixed with the ball mill, and then fired at 400° C. −750° C. under nitrogen atmosphere for 24 hours to synthesize compounds of $Li_{1+x}Mn_yFe_zPO_4$ having a composition shown in Table 1.

The X-ray powder diffraction patterns of the obtained compounds of Examples 1-5 were measured. The rotating-anode type of Rigaku RINT2500 was used for an X-ray diffractometer. In this respect, the X-ray diffractometer, equipped with a vertical standard type goniometer of 185 mm goniometer radius, is of the type monochromatizing the x-ray beam with the combination of a pulse-height analyzer and a counter monochromator without using a filter such as Kβ filter, and detecting specific X-ray with a scintillation counter. The measurement was carried out using CuKα (40 kV, 100 mA) as the specific X-ray, and setting each of an incident angle DS from a sample surface and an angle RS of the diffraction line from the sample surface to 1° and the width SS of an incident slit to 0.15 mm, by means of the reflection method with continuation scan (scanning range 2θ=10°–80° and scanning speed of 4°/min).

Figure 2:
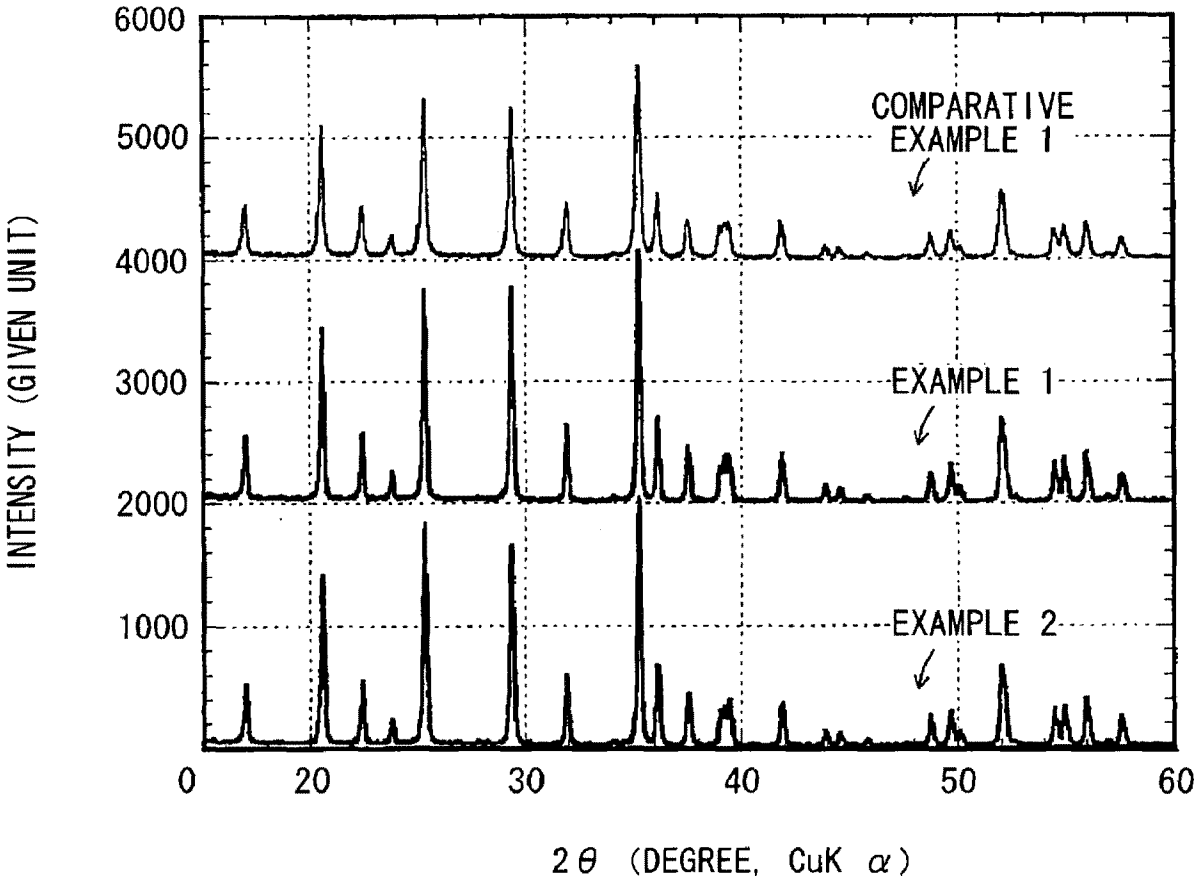
FIG. 2 is a characteristic view showing X-ray diffraction patterns of positive electrode materials according to examples of the invention.

The results showed that each obtained compound of the examples 1-5 is $Li_{1+x}Mn_yFe_zPO_4$ of olivine type single phase. As a representative of the examples, the diffraction patterns of Examples 1 and 2 are shown in FIG. 2.

Figure 3:
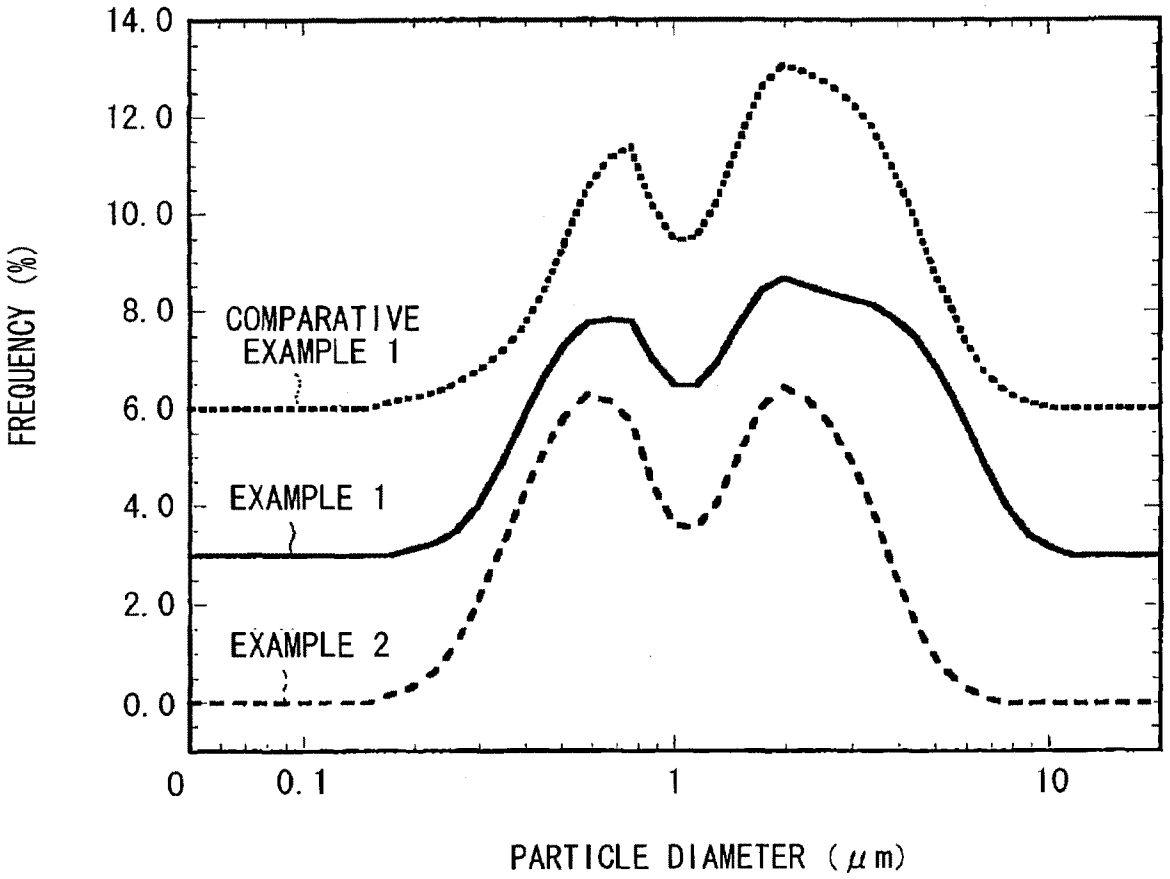
FIG. 3 is a characteristic view showing volume particle size distributions of the positive electrode materials according to the examples of the invention.

Moreover, the volume particle size distributions of the obtained compounds of Examples 1-5 were measured. The volume particle size distributions were measured by measuring dispersion of laser light using Microtrac particle analyzer LA-920 (Horiba Ltd.) as a measuring device. The results showed that each particle size of the obtained compounds of Examples 1-5 was 10 μm or less. As a representative of the examples, the volume particle size distributions of Examples 1 and 2 are shown in FIG. 3.

Furthermore, coin type batteries as shown in FIG. 1 were produced using the obtained compounds of Examples 1-5, the charge-and-discharge properties were tested, and the characteristics of the positive electrode materials were estimated.

The positive electrode 12 of the battery was produced as follows. First, the synthesized olivine type $Li_{1+x}Mn_yFe_zPO_4$ was dried, 60 mg thereof were weighed for the positive electrode material, acetylene black as the conductive agent and polyvinylidene fluoride (Aldrich #1300) as the binder were added, and the mixture was kneaded using N-methyl-2-pyrrolidone as the solvent to prepare the paste-like positive electrode mixture. Here, the proportions of the positive electrode material, acetylene black, and polyvinylidene fluoride were made of 85% by mass, 10% by mass, and 5% by mass, respectively. Then, the positive electrode mixture with the charge collector having a netting form consisting of aluminum was shaped into a pellet, and the pellet was dried at 100° C. in a dry argon (Ar) flow current for an hour to prepare the positive electrode 12.

A lithium metal pierced into a disk shape was used for the negative electrode 14, the porous film made from polypropylene was used for the separator 15, and a solution of $LiPF_6$ as the lithium salt dissolved to a concentration of 1 mol/dm$^3$ in a mixed solvent of propylene carbonate and dimethyl carbonate at the volume ratio of 1:1 was used for the electrolytic solution 16. The battery was made to measure 20 mm in diameter and 2.5 mm high.

Figure 4:
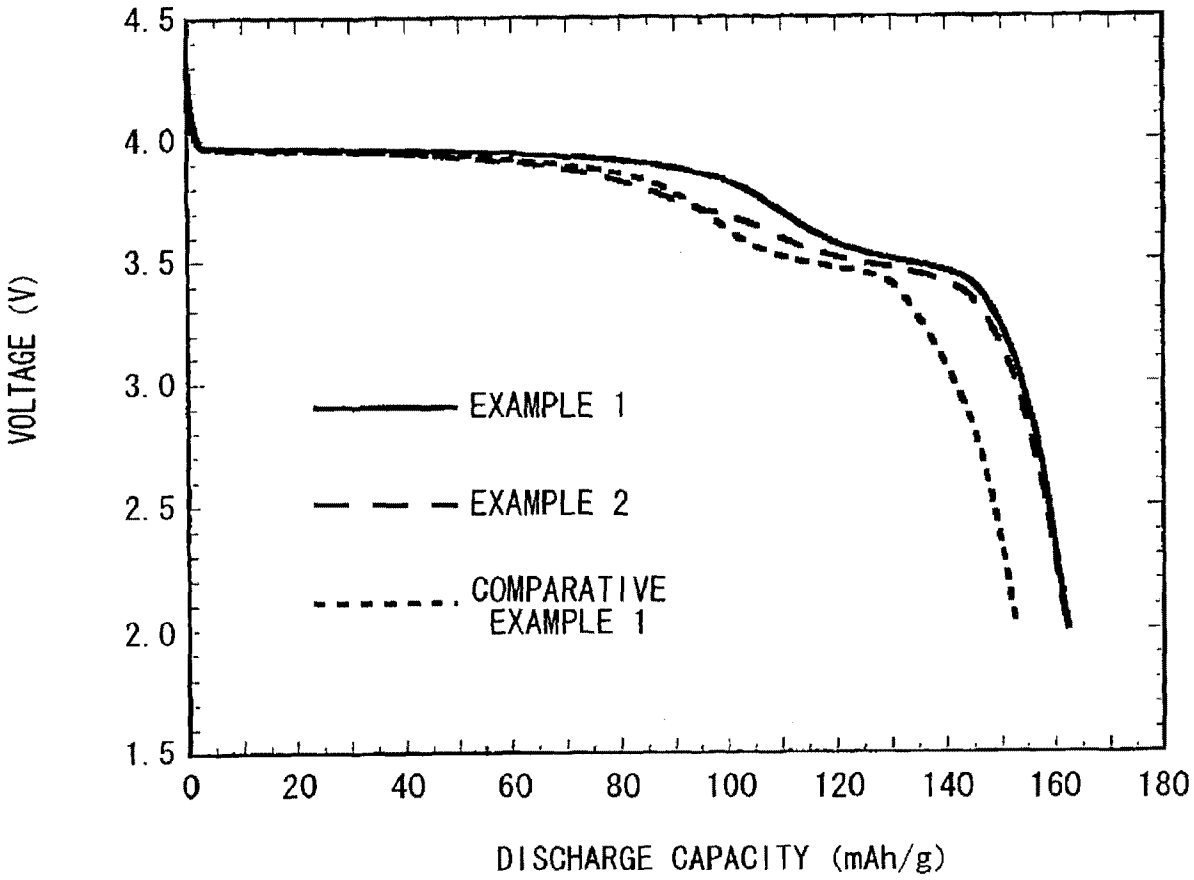
FIG. 4 is a characteristic view showing charge-and-discharge curves according to Examples 1 and 2 of the invention.

Moreover, the charge and discharge were performed as follows. First, constant-current charge was performed with the constant current until the voltage reached 4.5 V, then constant-voltage charge was performed with the constant voltage of 4.5 V until the current became 0.05 mA/cm$^2$ or less. Then, constant-current discharge was performed at the constant current until the voltage reached 2.0 V. The charge and discharge were performed at room temperature (23° C.) at that time. FIG. 4 shows the charge-and-discharge curves of Examples 1 and 2, FIG. 5 shows the charge-and-discharge curves of Examples 3 and 4, and FIG. 6 shows the charge-and-discharge curve of Example 5.

And, compounds $Li_{1+x}Mn_yFe_zPO_4$ having the composition shown in Table 1 were synthesized as Comparative Examples 1 and 2 for comparing with Examples 1-5 in a similar way to Examples 1-5 except for varying the compounding ratio of the materials as shown in Table 1. The x-ray powder diffraction patterns as well as the volume particle size distributions of the obtained compounds of Comparative Examples 1 and 2 were measured in a similar way to Examples 1-5. The results showed that each of the obtained compounds of Comparative Examples 1 and 2 has $Li_{1+x}Mn_yFe_zPO_4$ of olivine type single phase, and each of the particle sizes thereof is 10 μm or less. As a representative of the comparative examples, in FIGS. 2 and 3 are shown the diffraction pattern and the volume particle size distribution of Comparative Example 1, respectively.

Furthermore, coin type batteries were produced using the obtained compound of Comparative Examples 1 and 2 in a similar way to Examples 1-5, the charge-and-discharge properties were tested, and the characteristics of the positive electrode materials were estimated. In FIG. 4 is shown the charge-and-discharge curve of Comparative Example 1, and in FIGS. 5 and 6, are shown the charge-and-discharge curves of Comparative Example 2.

Figure 5:
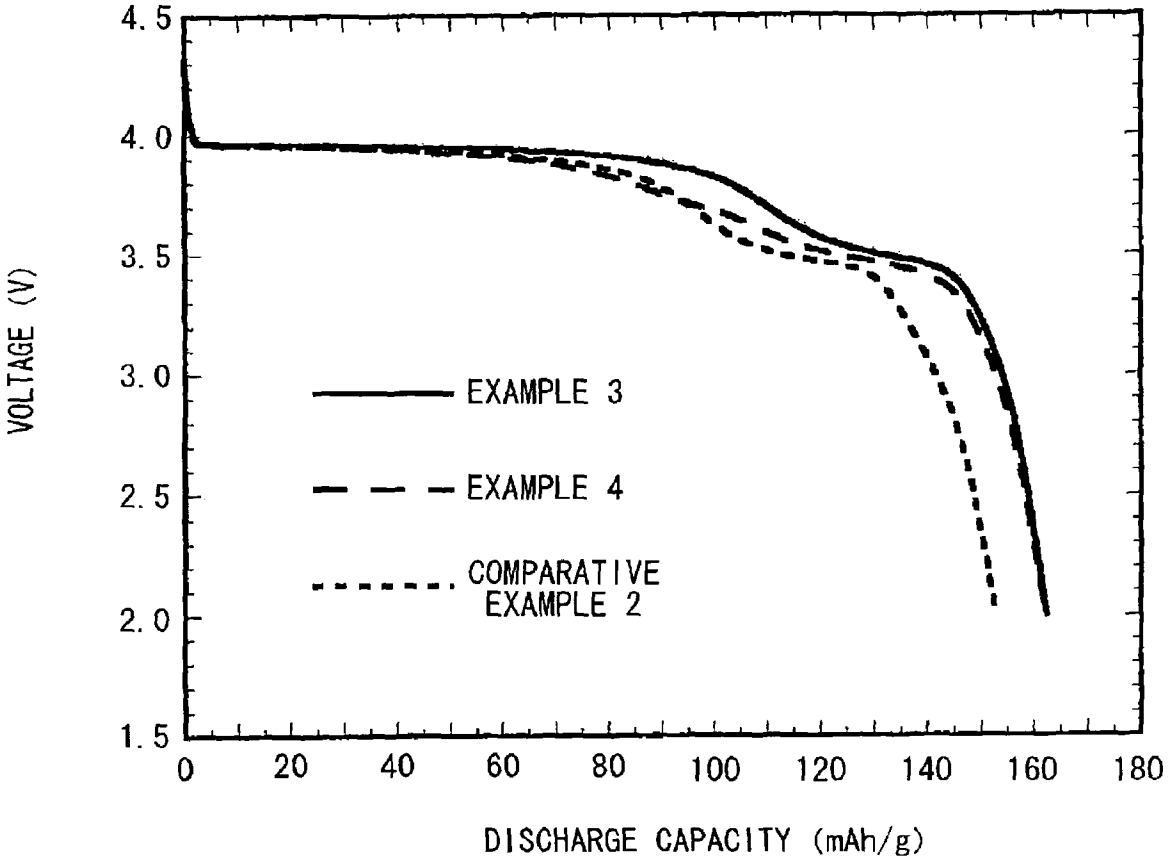
FIG. 5 is a characteristic view showing charge-and-discharge curves according to Examples 3 and 4 of the invention.
Figure 6:
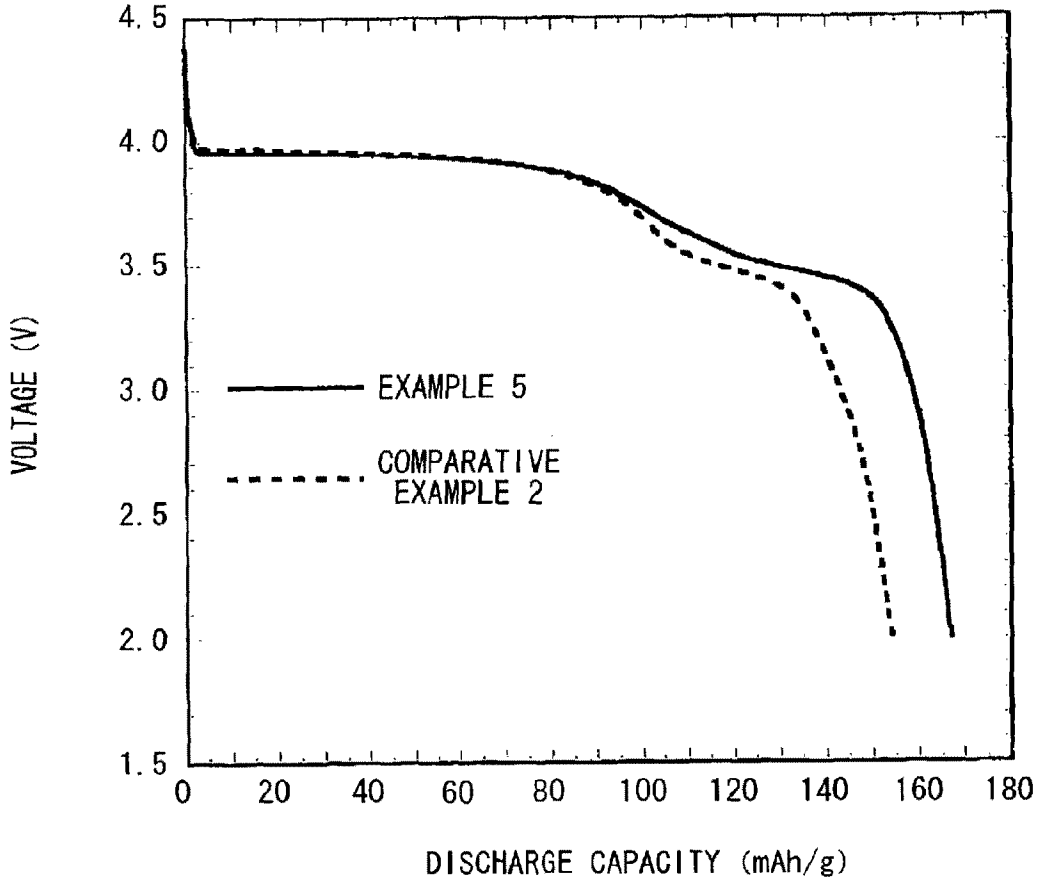
FIG. 6 is a characteristic view showing a charge-and-discharge curve according to the Example 5 of the invention.

As shown in FIGS. 4 to 6, compared with Comparative Examples 1 and 2 to which Li was not added in excess, Examples 1-5 to which Li was added in excess supplied higher discharge capacities and displayed flat characteristics at the discharge of 4 V over a wider range. That is, the addition of Li in excess has proved to supply the higher capacity and the higher voltage.

It should be noticed that as shown in the comparison between Examples 1 and 2, or between Examples 3 and 4, Examples 2 or 4 having the added excess Li displayed the flat characteristic at the discharge of 4 V over a shorter range than that of Examples 1 or 3. That is, it has been found that avoiding too much amount of the added excess Li can make the capacity higher at the high voltage.

In addition, Table 2 shows the discharge capacities, the average discharge voltages, and energy densities in relation to Examples 1, 3, and 5 in the case of discharging to the voltage of 2.0 V. As shown above, according to the example, it has been possible to achieve the high actual capacity which may reach a theoretical capacity of 170 mAh/g, and the high-energy density.

Figure 7:
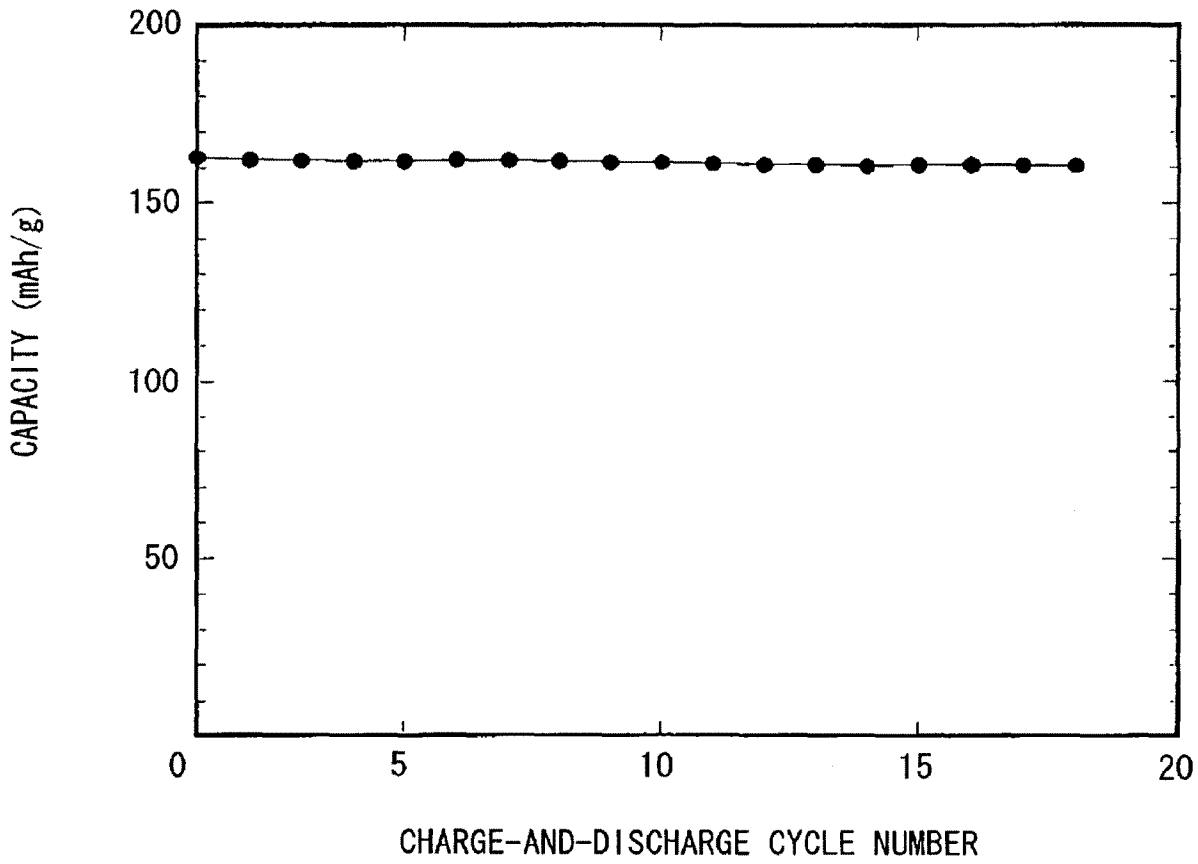
FIG. 7 is a characteristic view showing a relation between the number of charge-and-discharge cycles and the capacity according to Example 3 of the invention.

Moreover, in relation to Example 3, the charge and discharge were repeated under the charge-and-discharge condition mentioned above and changes of the capacity with the charge-and-discharge cycles were examined. The results are shown in FIG. 7. The results revealed that according to the example, degradation of the capacity has not been found, and that an excellent cycle property can be also obtained.

Although some examples of the compositions of the compound $Li_{1+x}Mn_yFe_zPO_4$ are explained in the above-mentioned examples, it should be noticed that the same effects can be obtained, when the added excess Li, i.e., x of the general formula shown in the chemical formula 1 is more than 0.

Although the invention has been described by the foregoing embodiment and examples, the invention is not limited to the embodiment and the examples but can be variously modified. For example, while the case of containing the compound expressed by the general formula shown in the chemical formula 1 as the positive electrode material has been described in the above-mentioned embodiment and examples, in addition to the compound, another lithium content oxide such as $LiCoO_2$, $LiNiO_2$, $LiMnO_2$, or $LiMn_2O_4$, a lithium sulfide, polymeric material, or the like may be contained in the positive electrode material.

Moreover, although the coin type secondary battery has been described concretely in the above-mentioned embodiment and examples, the invention can be similarly applied to cylindrical secondary batteries having another configuration, secondary batteries having another shape such as a button type or a square shape, or secondary batteries having another structure such as a winding structure.

Furthermore, although the case of using the liquid electrolyte, i.e., the electrolytic solution has been described in the above-mentioned embodiment and examples, other electrolytes may be used. Examples of other electrolytes include gel-state electrolytes with an electrolytic solution hold by a high molecular compound, organic solid electrolytes with an electrolyte salt dispersed in an ion-conductive high molecular compound, inorganic solid electrolytes consisting of an ion conductive ceramic, an ion conductive glass, an ionic crystal, or the like, any combination of these inorganic solid electrolytes and these electrolytic solutions, or any combination of these inorganic solid electrolytes and these gel-state electrolytes or these organic solid electrolytes.

In addition, while the case of using the positive electrode material of the invention for the secondary battery has been described in the above-mentioned embodiment and examples, the invention can be also applied to other batteries such as a primary battery.

As described above, according to the positive electrode material of the invention, since the positive electrode material contains the compound expressed by the above-mentioned general formula $Li_{1+x}Mn_yFe_zPO_4$, the higher discharge voltage can be obtained due to Mn, the Jahn Teller effect of $Mn^{3+}$ can be attenuated and furthermore distortion of the crystal structure can be inhibited due to Fe and the excess Li. Consequently, the higher discharge voltage can be achieved without reducing the capacity.

Furthermore, according to the battery of the invention, since the positive electrode material is used for the positive electrode, the high capacity and the high discharge voltage can be achieved and the excellent charge-and-discharge properties can be obtained.

Obviously many modifications and variations of the present invention are possible in the light of the above teachings. It is therefore to be understood that within the scope of the appended claims the invention may be practiced otherwise than as specifically described.

$$Li_{1+x}Mn_yFe_zPO_4 \qquad \text{(Chemical formula 1)}$$

(wherein x, y and z are values within ranges of $0<x<0.1$, $0.5<y<0.95$, and $0.9<y+z\leq 1$, respectively.)

TABLE 1

| | Compounding Ratio (mol ratio) $MnCo_3$:$FeC_2O.2H_2O$:$NH_4H_2PO_4$:$Li_2CO_3$ | $Li_{1+x}Mn_yFe_zPO_4$ |
|---|---|---|
| Example 1 | 1.4:0.54:2:1.03 | $Li_{1.03}Mn_{0.7}Fe_{0.27}PO_4$ |
| Example 2 | 1.4:0.5:2:1.05 | $Li_{1.05}Mn_{0.7}Fe_{0.25}PO_4$ |
| Example 3 | 1.5:0.44:2:1.03 | $Li_{1.03}Mn_{0.75}Fe_{0.22}PO_4$ |
| Example 4 | 1.5:0.4:2:1.05 | $Li_{1.05}Mn_{0.75}Fe_{0.2}PO_4$ |
| Example 5 | 1.5:0.5:2:1.03 | $Li_{1.03}Mn_{0.75}Fe_{0.25}PO_4$ |
| Comparative Example 1 | 1.4:0.6:2:1 | $LiMn_{0.7}Fe_{0.3}PO_4$ |
| Comparative Example 2 | 1.5:0.5:2:1 | $LiMn_{0.75}Fe_{0.25}PO_4$ |

TABLE 2

| | Discharge Capacity (mAh/g) | Average Discharge voltage (v) | Energy Density (kW/kg) |
|---|---|---|---|
| Example 1 | 163 | 3.56 | 580 |
| Example 3 | 163 | 3.59 | 585 |
| Example 5 | 166 | 3.58 | 594 |

The invention claimed is:

[1. A positive electrode material containing a compound expressed by a general formula $Li_{1+x}Mn_yFe_zPO_4$ (wherein x, y and z are values within ranges of $0<x<0.1$, $0.5<y<0.95$, and $0.9<y+z\leq 1$, respectively).]

[2. A positive electrode material according to claim 1, wherein the compound contains one having a particle diameter of 10 μm or less and the Brunauer-Emmet-Teller specific surface area thereof is 0.5 $m^2/g$ or more.]

[3. A battery comprising an electrolyte as well as a positive electrode and a negative electrode, wherein the positive electrode contains a compound expressed by a general formula $Li_{1+x}Mn_yFe_zPO_4$ (wherein x, y and z are values within ranges of $0<x\leq 0.1$, $0.5<y<0.95$, and $0.9<y+z<1$, respectively).]

[4. A battery according to claim 3, wherein the positive electrode comprises furthermore a conductive agent and a binder.]

[5. A battery according to claim 3, wherein the negative electrode is constituted to contain one, two or more materials selected from the group consisting of lithium metals, lithium alloys, and materials capable of insertion and extraction of lithium.]

[6. A battery according to claim 5, wherein the materials capable of insertion and extraction of lithium is constituted to contain one, two or more materials selected from the group consisting of carbonaceous materials, metal compounds, silicon, silicon compounds, and conductive polymers.]

[7. A battery according to claim 3, wherein the electrolyte is constituted to contain one, two or more materials selected from the group consisting of $LiPF_6$, $LiClO_4$, $LiAsF_6$, $LiBF_4$, $LiCF_3SO_3$ and $LiN(CF_3SO_2)_2$.]

*8. A battery comprising an electrolyte as well as a positive electrode and a negative electrode, wherein the positive electrode contains a compound containing excess lithium and expressed by a general formula $Li_{1+x}Mn_yFe_zPO_4$, with x, y, and z being values within the ranges of $0<x\leq 0.1$, $0.5<y<0.95$, and $0.9<y+z<1$, respectively,*

*wherein,*

*the negative electrode contains at least one material selected from the group consisting of lithium metals, lithium alloys, and a material capable of insertion and extraction of lithium, and*

*the electrolyte contains at least one material selected from the group consisting of $LiPF_6$, $LiClO_4$, $LiAsF_6$, $LiBF_4$, $LiCF_3SO_3$ and $LiN(CF_3SO_2)_2$.*

*9. A positive electrode material containing (a) an olivine compound having excess lithium, the olivine compound being expressed by general formula $Li_{1+x}Mn_yFe_zPO_4$, wherein x, y, and z are values within the ranges of $0<x<0.1$, $0.5<y<0.95$, and $0.9<y+z<1$, respectively; and (b) $LiCoO_2$, $LiNiO_2$, $LiMnO_2$, $LiMn_2O_4$, a lithium sulfide, or a polymeric material.*

*10. A positive electrode material according to claim 9, wherein the compound contains a particle having a diameter of 10 μm or less and the Brunauer-Emmet-Teller specific surface area thereof is 0.5 $m^2/g$ or more.*

*11. A battery comprising an electrolyte as well as a positive electrode and a negative electrode, wherein the positive electrode contains (a) a compound containing excess lithium and expressed by general formula* $Li_{1+x}Mn_yFe_zPO_4$*, with x, y, and z being values within the ranges of* $0<x\leq 0.1$*,* $0.5<y<0.95$*, and* $0.9<y+z<1$*, respectively; and (b) (b)* $LiCoO_2$*,* $LiNiO_2$*,* $LiMnO_2$*,* $LiMn_2O_4$*, a lithium sulfide, or a polymeric material.*

*12. A battery according to claim 11, wherein the positive electrode further comprises a conductive agent and a binder.*

*13. A battery according to claim 11, wherein the negative electrode contains at least one material selected from the group consisting of lithium metals, lithium alloys, and a material capable of insertion and extraction of lithium.*

*14. A battery according to claim 13, wherein the material capable of insertion and extraction of lithium contains at least one material selected from the group consisting of carbonaceous materials, metal compounds, silicon, silicon compounds, and conductive polymers.*

*15. A battery according to claim 11, wherein the electrolyte contains at least one material selected from the group consisting of* $LiPF_6$*,* $LiClO_4$*,* $LiAsF_6$*,* $LiBF_4$*,* $LiCF_3SO_3$*, and* $LiN(CF_3SO_2)_2$*.*

* * * * *